Sept. 9, 1947.    D. L. JOCELYN    2,427,284
ENGINE
Filed Aug. 28, 1942

INVENTOR
Douglas L. Jocelyn.
BY
Dike, Calver & Gray
ATTORNEYS.

Patented Sept. 9, 1947

2,427,284

UNITED STATES PATENT OFFICE 2,427,284

ENGINE

Douglas L. Jocelyn, Detroit, Mich.

Application August 28, 1942, Serial No. 456,519

4 Claims. (Cl. 123—119)

This invention relates to vehicles propelled with the aid of internal combustion engines, such for instance as various types of aircraft, and to power plants therefor.

One of the objects of the present invention is to provide an improved vehicle, such as an airplane, propelled with the aid of an internal combustion engine, means being provided to increase for short periods of time the volumetric efficiency of the engine, said means being adapted to perform other important functions in the vehicle, such as cooling air for the passenger compartment of the airplane, when such increase in volumetric efficiency is not necessary.

One of the objects of the present invention is to provide an improved aircraft power plant in which there are provided means for cooling the incoming air during relatively short predetermined periods, such as during take-offs, thereby increasing the volumetric efficiency of the power plant engine, its maximum power output, and consequently the useful load capacity of the aircraft.

Another object of the present invention is to provide an improved aircraft power plant in which there are provided means delivering chilled air into the engine jacket for cooling engine cylinders, such cooling means being capable of performing the entire cooling function in the engine where elimination of cumbersome and heavy liquid cooling systems susceptible to easy damaging is desired, or being adapted to operate as a stand-by or emergency cooling system to take the place of a liquid cooling system should the same become inoperative for any reason.

A further object of the invention is to provide an improved aircraft having a power plant including an internal combustion engine and a supercharger, the supercharger being utilized also as a pressure building device of the air cooling system.

A still further object of the invention is to provide an improved aircraft having a passenger compartment and an internal combustion engine with a supercharger, means being provided whereby said supercharger may be operated selectively either as a supercharger at higher altitudes, or as the air compressing device of an air cooling system for cooling the air supplied to the engine during the takeoff for cooling the engine cylinders, or for supplying conditioned air into the passenger cabin.

It is an added object of the present invention to provide an improved structure of the foregoing character which is simple in construction, dependable in operation, and relatively inexpensive to manufacture.

Other objects of this invention will appear in the following description and appended claims, reference being had to the accompanying drawings forming a part of this specification wherein like reference characters designate corresponding parts in the several views.

Figure 1:
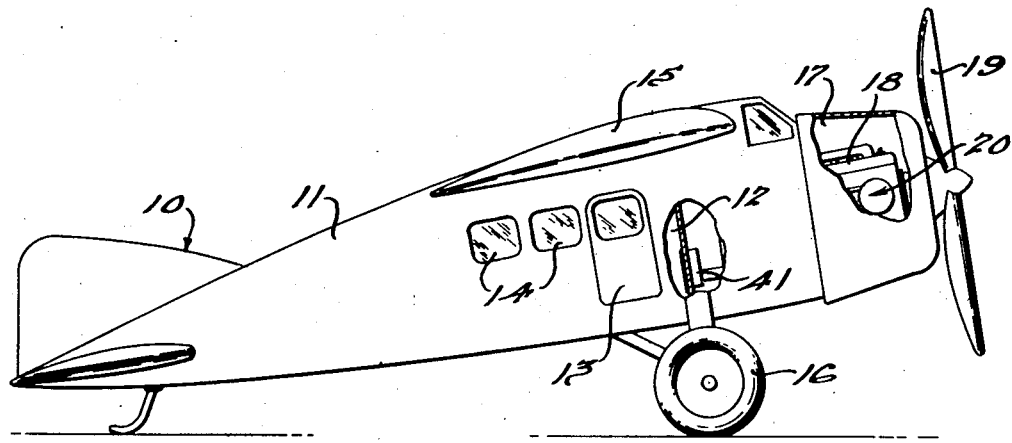
Fig. 1 is a side view of an aircraft embodying the present invention, parts of the walls of said aircraft being broken away to show the arrangement of the operative parts of the air cooling system.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown by way of example an airplane embodying the present invention. Although the present invention is herein illustrated and described as embodied in an airplane, it will be understood that it is applicable to various vehicles propelled with the aid of internal combustion engines, such for instance as automobiles and the like.

Referring to the drawings, there is shown an airplane generally indicated by the numeral 10 and comprising a main body portion or fuselage 11 having a passenger compartment 12 formed therein, into which access may be had through a door 13. Windows 14 are provided in the walls of the compartment 12 to admit light. The wings 15 and the landing gear 16 are secured to the fuselage 11 in a manner well known in the art. Within the front part of the fuselage 10 there is formed a power plant compartment 17 in which there is operatively arranged an internal combustion engine 18 adapted to drive a screw propeller 19. A supercharger device 20 driven by the engine 18 is operatively arranged within the power plant compartment, and it is adapted to perform its conventional function, namely increasing the air pressure in the intake manifold of the engine at high altitudes, thus increasing the volumetric efficiency of the engine and consequently the ceiling of the airplane. The structure so far described is well known in the art and no further detailed description thereof is deemed necessary.

In accordance with the invention there are provided means whereby the supercharger 20 may be selectively operated as an air compressing device for an air cooling system incorporated into the power plant, which system operates to cool the air discharged by the supercharger to a desirable temperature. The air so cooled is used to a great advantage at certain particular operation conditions of the engine and of the entire airplane, thereby greatly improving operation thereof. Although superchargers of conventional types are not intended to produce pressures usually attained with the aid of piston compressors such as are used in refrigeration devices, the pressure attainable with the aid of such superchargers is sufficient for the purposes of the present invention, since in connection therewith it is not necessary to cool or to chill the air to such low temperatures as is practiced in connection with conventional refrigeration devices. In many instances a drop of several degrees below the atmospheric temperature is sufficient to produce the beneficial results constituting the objects of the present invention.

In general, the chilled air may be used in the engine cylinders during the take-offs when maximum power output of the engine is desirable. By chilling the air and increasing its density a larger mass of air is supplied into an engine cylinder of a definite volume or cubic capacity, whereby considerable increase in the volumetric efficiency of the engine is effected. It should be distinctly understood that during the take-offs the supercharger device 20 may be efficiently used in the air cooling system, since on the ground it will not be called upon to perform its conventional supercharging function, and it is only at high altitudes that such supercharging function becomes important. In addition, the chilled air may be used outside of the engine cylinders for cooling the walls thereof. For such a purpose the chilled air may be either forced through the engine jacket or applied to the cylinder exterior in any other suitable way. Such cooling may be used in an engine either as a regular cooling system or as an emergency or stand-by system supplementary to the regular liquid cooling system which may become inoperative for some reason such as leakage of the liquid due to some damage to the cooling system during the flight. The cylinder cooling function of the system normally will not be necessary or indispensable during take-offs and therefore the entire capacity of the air cooling system may be utilized for cooling the air intended for operating the engine itself.

In addition, the chilled air produced by the air cooling system for which the supercharger is utilized may be advantageously used for supplying the chilled air to the air conditioning system of the passenger compartment. Again this function is not indispensable during the short period of take-offs when the full capacity of the air cooling system will be needed for supplying the chilled air into the engine cylinder, nor at very high altitudes where the normal supercharging function of the supercharger will be necessary, since at high altitudes the outside air is relatively cold and no artificial cooling of the air is necessary.

Figure 2:
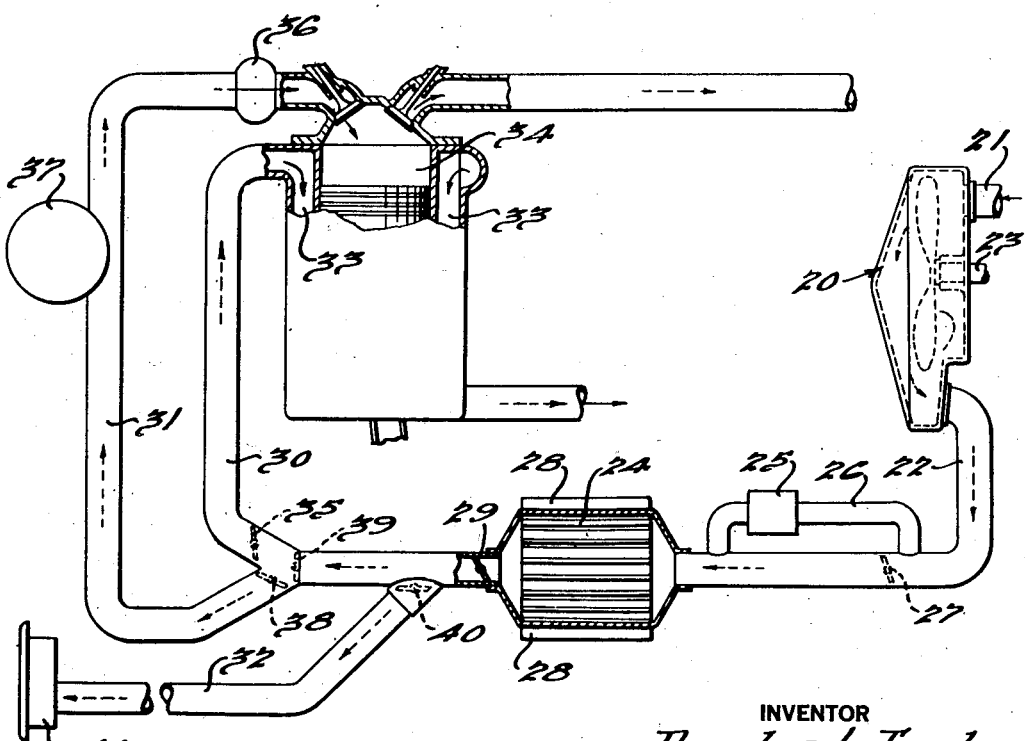
Fig. 2 is a diagrammatic view illustrating the power plant and the air cooling system combined therewith.

Referring to the drawing and particularly to Fig. 2 thereof, the supercharger 20 which may be of any suitable type has an intake pipe 21 and a discharge pipe 22. A shaft 23 provides a driving connection between the engine 18 and the supercharger 20. The discharge pipe 22 is adapted to deliver the air into a compression chamber 24. If desired, a booster unit 25 may be arranged in a by-pass conduit 26 to provide a second compression stage for the air discharged by the supercharger 20 and thereby to increase the pressure thereof to a higher point. A valve 27 operated in any suitable way may be provided in order to switch the booster unit on and off.

On the compression chamber 24 there are provided means such as external and internal fins 28 and the like for removing the heat of compression from the air compressed in said chamber 24. The compression chamber 24 is shown diagrammatically. It will be understood that it may be of considerable area and may be provided in such places of the airplane or incorporated in the structure thereof in such a manner that considerable areas of said chamber are exposed to the outside air and its hard rubbing and cooling action. A throttle valve 29 is provided to effect expansion of the compressed and cooled air in order to effect a still further drop in the temperature thereof.

The air so chilled may be selectively directed to one or more of the branch conduits 30, 31 and 32. The branch conduit 30 leads into the cooling jacket 33 of the power cylinder 34, a valve 35 being provided to open and to close said conduit selectively. The conduit 31 leads into the intake manifold 36 of the engine, a carburetion device 37 being operatively interposed therein. In order not to interfere with the proper atomization and evaporation of fuel, special means such as heating of the carburetor device or of a branch conduit leading through such carburetion device 37 by exhaust gases, may be provided. Numerous such means are well known in the art and description thereof is not deemed necessary herein. A valve 38 is provided in the conduit 31 for selectively opening and closing the same. A valve 39 is adapted to close both conduits 30 and 31.

A conduit 32 controlled by a valve 40 is adapted to deliver the chilled air selectively to the air conditioning device 41 which, in turn, discharges the air in proper quantities and in a desired way into the passenger compartment 12.

There is thus provided a system whereby numerous valuable advantages may be achieved in a transportation instrumentality such as an airplane, using therefor the conventional supercharging device already provided therein. Thus the supercharging device is advantageously used during practically the entire flight of the airplane beginning with the take-off thereof.

I claim:

1. In a power plant, an internal combustion engine having an air intake and a heat exchange jacket associated with the engine, a supercharger, a cooling chamber for receiving air from said supercharger, a main conduit leading from said chamber to said air intake, a by-pass conduit leading from said main conduit to said jacket, and valve means for selectively controlling the flow of air through said conduits.

2. In a power plant, an internal combustion engine cylinder having an air intake, heat exchange means associated with said cylinder for controlling the temperature thereof, an air intake conduit leading to said air intake, a by-pass conduit leading from the air intake conduit to said heat exchange means, a cooling chamber communicating with said intake conduit in advance of the by-pass conduit, and valve means for selectively controlling the flow of air through said conduits.

3. In a power plant, an internal combustion engine cylinder having an air intake, a heat exchange jacket associated with said cylinder for controlling the temperature thereof, an air intake conduit leading to said air intake, a by-pass conduit leading from the air intake conduit to said heat exchange means, a cooling chamber communicating with said intake conduit in advance of the by-pass conduit, and valve means for selectively controlling the flow of air through said conduits.

4. In a power plant, an engine cylinder having an air intake, a cooling jacket surrounding the cylinder, an air intake conduit leading to said intake, a by-pass conduit leading from said intake conduit to said jacket, valve means for selectively controlling the flow of air through said conduits, a cooling chamber communicating with said intake conduit in advance of said by-pass conduit, and impeller means for delivering air to said chamber.

DOUGLAS L. JOCELYN.

REFERENCES CITED

The following references are of record in the file of this patent:

UNITED STATES PATENTS

| Number | Name | Date |
|---|---|---|
| 879,392 | Levilly | Feb. 18, 1908 |
| 1,493,242 | Caproni | May 6, 1924 |
| 1,634,931 | Cole | July 5, 1927 |
| 2,046,314 | Benkly | July 7, 1936 |
| 1,371,444 | Sherbondy | Mar. 15, 1921 |
| 2,063,477 | Young | Dec. 8, 1936 |
| 2,119,402 | Puffer | May 31, 1938 |
| 962,233 | Miller | June 21, 1910 |
| 866,654 | Jakob | Sept. 24, 1907 |
| 2,321,097 | Mills | June 8, 1943 |

FOREIGN PATENTS

| Number | Country | Date |
|---|---|---|
| 193,017 | England | Nov. 22, 1923 |
| 163,087 | Germany | Sept. 18, 1905 |